United States Patent
Konya

(10) Patent No.: US 6,722,612 B2
(45) Date of Patent: Apr. 20, 2004

(54) METHOD AND APPARATUS FOR CONTROLLING PASSENGER FLOW INTO AND OUT OF AIRCRAFT

(75) Inventor: Kazuhide Konya, Mercer Island, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/119,441

(22) Filed: Apr. 9, 2002

(65) Prior Publication Data

US 2003/0189134 A1 Oct. 9, 2003

(51) Int. Cl.[7] ............................................. B64D 9/00
(52) U.S. Cl. ...................... 244/137.2; 14/72.5; 14/71.1
(58) Field of Search .......................... 244/137.1, 137.2; 14/69.5–72.5; 182/113; 256/59, 67, 65

(56) References Cited

U.S. PATENT DOCUMENTS

| | | | |
|---|---|---|---|
| 922,430 A | | 5/1909 | Howson |
| 1,178,239 A | | 4/1916 | Kling |
| 1,224,681 A | | 5/1917 | Steele |
| 2,547,811 A | * | 4/1951 | Burnelli ........................ 244/36 |
| 3,419,164 A | * | 12/1968 | O'neill .................... 244/137.2 |
| 3,515,074 A | * | 6/1970 | Helbig .................... 244/137.2 |
| 3,583,465 A | | 6/1971 | Youngs et al. |
| 3,666,045 A | * | 5/1972 | Olsen ......................... 182/113 |
| 4,246,980 A | * | 1/1981 | Miller ..................... 244/137.2 |
| 4,712,339 A | * | 12/1987 | Wenham et al. ............... 14/71 |
| 5,176,082 A | | 1/1993 | Chun et al. |
| 5,615,848 A | | 4/1997 | Ceriani |
| 6,012,679 A | | 1/2000 | Auestad |
| 6,045,157 A | * | 4/2000 | Poulin ........................ 182/113 |
| 6,227,523 B1 | * | 5/2001 | Haberlen ..................... 256/59 |
| 6,257,523 B1 | | 7/2001 | Olliges |
| 2002/0063187 A1 | * | 5/2002 | Depeige et al. .......... 244/137.2 |

FOREIGN PATENT DOCUMENTS

| | | | | |
|---|---|---|---|---|
| EP | 0372386 | * | 6/1990 | ............. 244/137.2 |
| GB | 2091183 | * | 7/1982 | ............. 244/137.2 |

OTHER PUBLICATIONS

MD–12 Program Review, McDonnell Douglas and the MD–12 Team, Apr. 30, 1992 (p. 12).

FMC Airport Systems, Jetway, The Bridge That Spans the Globe Brochure (54 pages), Copyright 2001 FMC Technologies, Inc.

* cited by examiner

Primary Examiner—Galen L. Barefoot
(74) Attorney, Agent, or Firm—Perkins Coie LLP

(57) ABSTRACT

A method and apparatus for controlling passenger flow into and out of an aircraft. The apparatus can include a walkway elongated along a longitudinal axis and having a first portion and a second portion with the first portion configured to be positioned adjacent to an aircraft doorway. The walkway can have a width generally transverse to the longitudinal axis sized to accommodate at least two people walking abreast. A restriction can be coupled to the walkway and can extend along the longitudinal axis to divide the walkway into a first aisle and a second aisle with each aisle being elongated along the longitudinal axis and with the restriction at least restricting movement by people from the first aisle to the second aisle. The restriction can be moveable relative to the walkway between a stowed position and a deployed position and can include elements such as upright members, transverse handrails, and/or flexible planar sheets.

96 Claims, 8 Drawing Sheets

METHOD AND APPARATUS FOR CONTROLLING PASSENGER FLOW INTO AND OUT OF AIRCRAFT

CROSS-REFERENCE TO RELATED APPLICATION

The present application is related to pending U.S. patent application Ser. No. 10/119,442 titled METHOD AND APPARATUS FOR CONTROLLING PASSENGER FLOW ON AIRCRAFT, filed concurrently herewith and incorporated herein in its entirety by reference.

TECHNICAL FIELD

The present invention relates generally to methods and apparatuses for controlling the flow of passengers into and out of aircraft.

BACKGROUND

Existing commercial passenger aircraft are typically loaded and unloaded via a single doorway positioned toward the front of the aircraft. In one existing arrangement, a jetway extends from the doorway to an adjacent terminal structure to allow passengers to embark and disembark without being exposed to the weather. Alternatively, an open stairway can be positioned adjacent to the doorway, for example, when loading and unloading in predictably temperate conditions.

One drawback with both of the foregoing approaches is that loading and unloading the aircraft can take a substantial amount of time. The time spent loading and unloading passengers can significantly add to the passengers' overall trip time, and can reduce the airline's ability to fully utilize the aircraft. One approach to addressing this drawback is to position an additional jetway (or stairway) adjacent to a rear door of the aircraft to expedite loading and unloading. However, this approach can also have drawbacks. For example, this approach increases the number of jetways that airports must provide, and can increase the cost and complexity of the ground-based passenger handling systems.

SUMMARY

The present invention is directed generally toward methods and apparatuses for controlling passenger flow into and out of aircraft. An apparatus in accordance with an aspect of the invention includes a walkway elongated along a longitudinal axis and having a first portion toward one end of the longitudinal axis and the second portion toward the other end of the longitudinal axis. The first portion is configured to be positioned adjacent to an aircraft doorway. The walkway has a width generally transverse to the longitudinal axis sized to accommodate at least two people walking abreast. A restriction can be coupled to the walkway and can extend along the longitudinal axis to divide the walkway into a first aisle and a second aisle, each elongated along the longitudinal axis. The restriction can at least restrict movement by people from the first aisle to the second aisle.

In a further aspect of the invention, the restriction can be movably attached to the walkway and can be movable relative to the walkway between a deployed position with the restriction at least restricting movement by people between the first and second aisles, and a stowed position with the restriction allowing movement by people between the first and second aisles. The restriction can include upright members that are retractable into a floor portion of the walkway, an elongated barrier extendably coiled on a reel, and/or a generally planar, flexible sheet wound on a roller.

The invention is also directed toward a method for loading and/or unloading people from an aircraft. A method in accordance with one aspect of the invention includes providing a walkway elongated along the longitudinal axis and having a restriction extending along the longitudinal axis with a first aisle positioned on one side of the restriction and a second aisle positioned on another side of the restriction. The method can further include aligning the walkway with an aircraft door and directing first and second groups of people to pass through the walkway and the aircraft door. The method can still further include directing the first group of people to pass through the first aisle and simultaneously directing the second group of people to pass through the second aisle while at least restricting access between the first and second aisles with the restriction.

Another aspect of the invention is directed toward a method for retrofitting an apparatus for loading and/or unloading people from and aircraft. The apparatus can include a walkway elongated along a longitudinal axis and the method can include aligning a restriction with the longitudinal axis of the walkway and coupling the restriction to the walkway with the restriction positioned to at least restrict movement by people from a first aisle on one side of the longitudinal axis to a second aisle on another side of the longitudinal axis.

DETAILED DESCRIPTION

The present disclosure describes passenger aircraft and methods and apparatuses for loading and unloading passengers from such aircraft. Many specific details of certain embodiments of the invention are set forth in the following description and in FIGS. 1–15 to provide a thorough understanding of these embodiments. One skilled in the art, however, will understand that the present invention may have additional embodiments, and that the invention may be practiced without several of the details described below.

Figure 1:
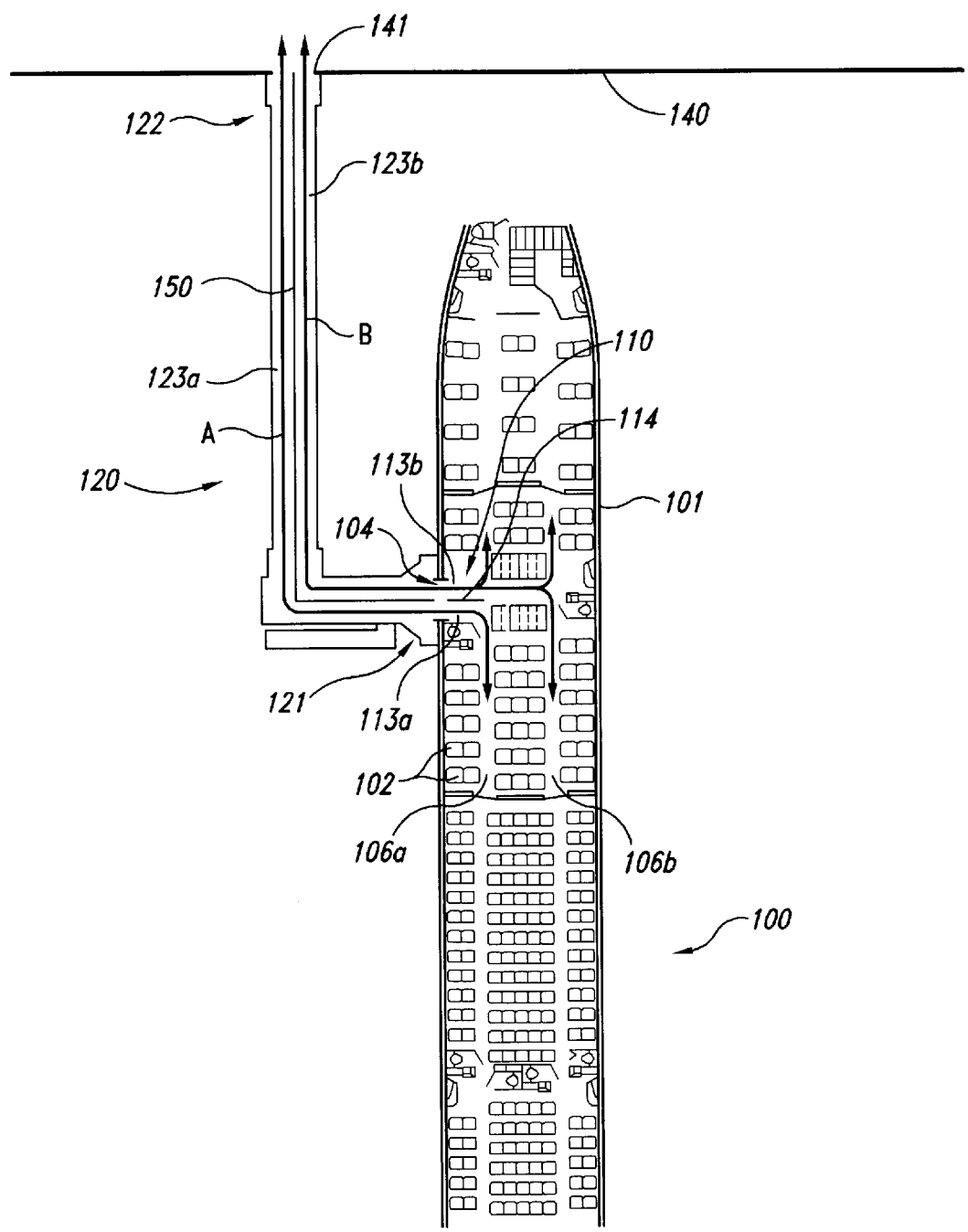
FIG. 1 is a cross-sectional plan view of a portion of an aircraft positioned adjacent to a walkway in accordance with an embodiment of the invention.

FIG. 1 is a partially schematic, cross-sectional plan view of a portion of an aircraft 100 positioned adjacent to a terminal structure 140. The aircraft 100 can include a fuselage 101 having seats 102 arranged in two seating aisles 106 (shown in FIG. 1 has a first seating aisle 106a and a second seating aisle 106b). The aircraft 100 can further include a doorway 104 and an entry region 110 that provides access between the doorway 104 and the seating aisles 106.

The terminal structure 140 can include a terminal doorway 141 and a walkway 120 positioned between the terminal doorway 141 and the aircraft doorway 104. Accordingly, the walkway 120 can include an enclosed ramp having a first portion 121 that is movably positioned adjacent to the aircraft doorway 104, and a second portion 122 that is fixedly attached to the terminal structure 140. The first portion 121 can move toward the aircraft 100 for loading and unloading, and away from the aircraft 100 prior to departure.

In one aspect of the arrangement shown in FIG. 1, the walkway 120 and/or the entry region 110 of the aircraft 100 can be configured to group passengers into two separate lines as they move between the seating aisles 106 and the terminal doorway 141. For example, the walkway 120 can include a walkway restriction 150 that forms two walkway aisles 123 (shown as a first walkway aisle 123a and a second walkway aisle 123b). The entry region 110 can include an entry restriction 114 that forms two entry aisles 113 (shown as a first entry aisle 113a and a second entry aisle 113b). Accordingly, passengers seated along the first seating aisle 106a can pass into and/or out of the aircraft 100 through the first entry aisle 113a and the first walkway aisle 123a (as indicated by arrow A), without interfering with the motion of passengers seated in the second seating aisle 106b, who can pass through the second entry aisle 113b and the second walkway aisle 123b (as indicated by arrow B). Further details of arrangements for facilitating this passenger flow are described below with reference to FIGS. 2–15.

Figure 2:
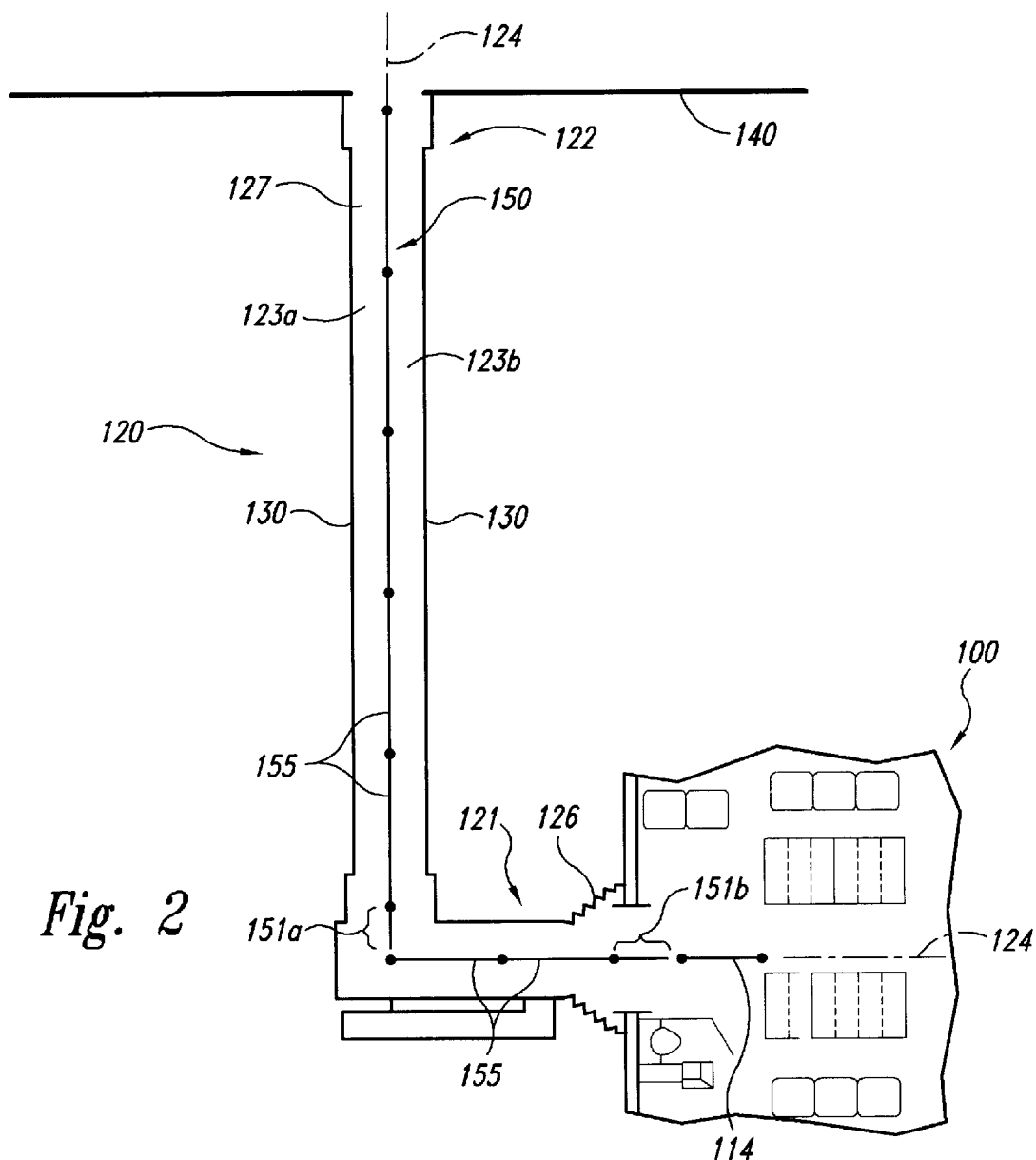
FIG. 2 is an enlarged plan view of a walkway in accordance with an embodiment of the invention.

FIG. 2 is an enlarged, cross-sectional plan view of an embodiment of the walkway 120 shown in FIG. 1. In one aspect of this embodiment, the walkway 120 can include a fixed pedestal bridge arrangement for which the second portion 122 is fixed relative to the terminal structure 140. The first portion 121 includes a telescoping section with a bellows 126 that can move toward and away from the aircraft 100, allowing the aircraft 100 to move toward and away from the terminal structure 140 without interference. The walkway 120 can be elongated along a walkway axis 124 that extends generally away from the terminal structure 140 and toward the aircraft 100.

In one aspect of this embodiment, the walkway 120 can include a floor portion 127, two facing wall portions 130 extending upwardly from the floor portion 127 and a ceiling portion (not visible in FIG. 2) positioned above the floor portion 127. The wall portions 130 can be spaced apart from each other by a distance sufficient to allow two people to walk abreast through the walkway 120.

For example, the walkway 120 can have a width transverse to the longitudinal axis 124 that is about 50 inches or greater in one embodiment and about 60 inches or greater in another embodiment.

In a further aspect of this embodiment, the walkway restriction 150 can be mounted to the floor portion 127 and can be aligned generally with the walkway axis 124. In other embodiments, the walkway restriction 150 can depend from other portions of the walkway 120, such as the ceiling portion, as described in greater detail below with reference to FIG. 8. In any of these embodiments, the walkway restriction 150 can include a plurality of segments 155 positioned adjacent to each other. In one embodiment, neighboring segments 155 can abut against each other. In another embodiment, neighboring segments 155 can be spaced apart from each other, for example, when neighboring segments 155 move relative to each other during movement of the walkway 120. An extension portion 151a can span at least part of the gap between spaced apart segments 155. Another extension portion 151b can project from the walkway 120 into the aircraft 100. One feature of the extension portion 151b that projects into the aircraft 100 is that it can allow the entry restriction 114 (described in greater detail below with reference to FIGS. 10–15) to be reduced in size or eliminated entirely.

Figure 3:
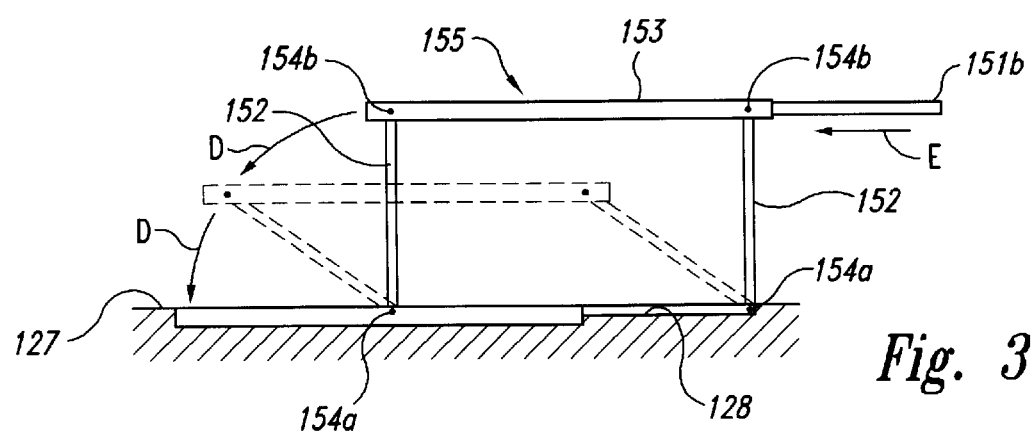
FIG. 3 is a partially schematic, side elevation view of a walkway restriction in accordance with an embodiment of the invention.
Figure 4:
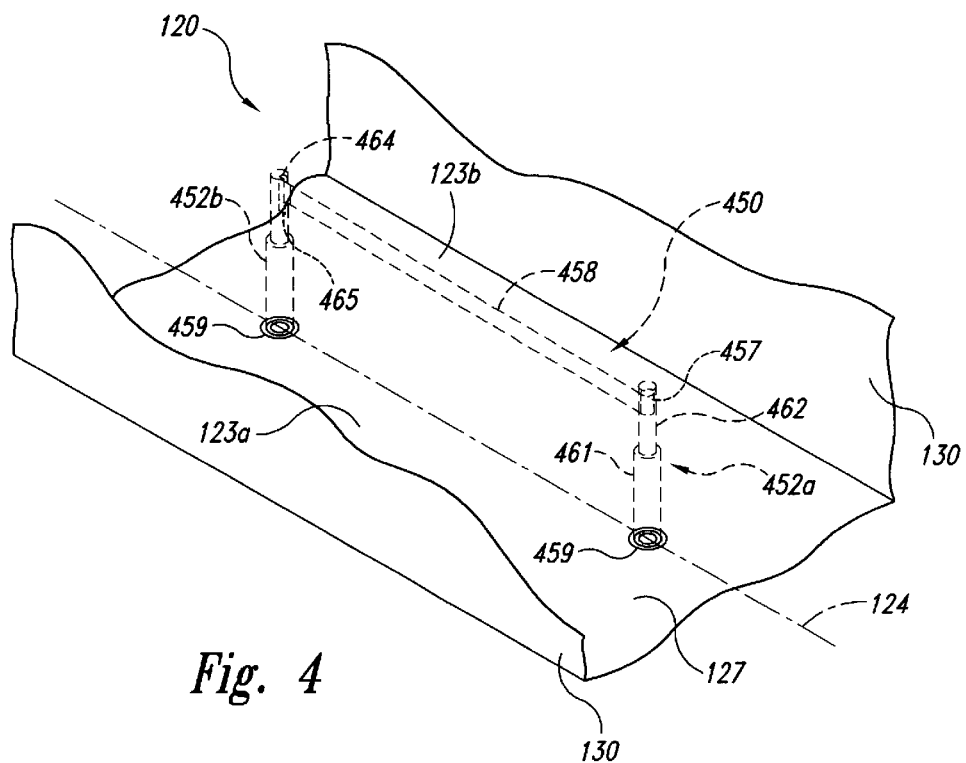
FIG. 4 is a partially schematic, cutaway isometric view of a portion of a walkway having a walkway restriction in accordance with another embodiment of the invention.

FIG. 3 is a partially schematic, side elevational view of a segment 155 of the walkway restriction 150 configured in accordance with an embodiment of the invention. In one aspect of this embodiment, the segment 155 can include two upright members 152 that are pivotably coupled to the floor portion 127 with pivot joints 154a. A handrail 153 is pivotably coupled to each of the upright members 152 with pivot joints 154b. The floor portion 127 can include a recess 128 configured to receive the upright members 152 and the handrail 153 when the segment 155 is folded downwardly, as indicated by arrows D. Accordingly, the segment 155 can be moved between a deployed position (shown in solid lines in FIG. 3) and a retracted position in which the segment 155 is recessed below the surface of the floor portion 127 in the recess 128. The segment 155 is shown midway between the deployed position and the retracted position in phantom lines in FIG. 3. When the segment 155 includes an extension portion 151b, the extension portion 151b can be telescopically connected to the handrail 153 and can be retracted within the handrail 153 when the segment 155 is moved to its retracted position, as indicated by arrow E.

In other embodiments, the walkway restriction 150 can have other arrangements. For example, the walkway restriction 150 can have configurations other than a pivotable configuration that also allow the walkway restriction 150 to move between a deployed position and an undeployed position. In another embodiment, the walkway restriction 150 can include a continuous, unsegmented structure. In still further embodiments, the walkway 150 can be rigidly attached to the walkway 120, rather than being movable between a deployed position and an undeployed position.

One feature of an embodiment of the aircraft 100 and the walkway 120 described above with reference to FIGS. 1–3 is that the walkway restriction 150 and the entry restriction 114 can allow passengers to form two independently moving lines as they move to and from the twin seating aisles 106 during loading and unloading. This arrangement can be optionally facilitated by widening the doorway 104, as described in greater detail below with reference to FIGS. 11–15. An advantage of separating passengers moving between the aircraft 100 and the terminal structure 140 into two lines is that this can reduce the time required to load and unload the aircraft 100. For example, in one embodiment in which the aircraft 100 has a seating capacity of 226 passengers, it is estimated that the time required to deplane passengers can be reduced by about 1 minute and the time to enplane passengers can be reduced by about 6.7 minutes, compared to existing single-line deplaning and enplaning arrangements. If the aircraft 100 has a baseline turnaround of about 59 minutes, this feature can reduce the turnaround time for the aircraft by about 13 percent. In other embodiments, the relative reduction in turnaround time can have other values.

Another feature of an embodiment of the walkway restriction 150 described above with reference to FIGS. 1–3 is that it can be moved between a deployed position and a retracted position. An advantage of this feature is that the same walkway 120 can be configured to support twin line loading/unloading (by deploying the walkway restriction 150) and single line loading/unloading (by retracting the walkway restriction 150). Accordingly, the walkway 120 can be versatile enough to service both twin aisle and single aisle commercial aircraft.

Yes another feature of the walkway restriction 150 is that it can be relatively simple to retrofit into existing walkways 120. For example, floor-mounted walkway restrictions 150 can be added to existing walkways 120 by coupling the walkway restrictions 150 to the floor portion 127 and, optionally, increasing the load-bearing capacity of the floor portion 127, for example, with structural reinforcements. An advantage of this feature is that adding the twin line loading feature to existing airport structures may not require substantial capital investments by airlines or airports.

Still another feature of an embodiment of the walkway restriction 150 described above with reference to FIGS. 1–3 is that it can include an extension portion 151b that extends into the aircraft 100. An advantage of this feature is that the walkway 120 can add the twin line loading/unloading feature to twin aisle aircraft that do not have an entry restriction 114.

FIGS. 4–8 illustrate walkway restrictions in accordance with other embodiments of the invention. Beginning with FIG. 4, a walkway restriction 450 can move telescopically between a deployed position (shown in phantom lines in FIG. 4) and a retracted position (shown in solid lines in FIG. 4). In one aspect of this embodiment, the walkway restriction 450 can include upright members 452 (shown as a first upright member 452a and a second upright member 452b) that retract into receptacles 459 positioned in the floor portion 127 of the walkway 120. Each upright member 452 can include an inner shaft 462 telescopically received in an outer shaft 461, both of which are received in the receptacle 459. In another embodiment, each upright member 452 can include a single shaft, or more than two nested shafts. In any of these embodiments, the first upright member 452a can have an extendable barrier 458 (such as a fabric band) initially rolled up on a spring-loaded reel 457. The end of the extendable barrier 458 can include a key 465 that can be releasably placed in a slot 464 of the second upright member 452b. Accordingly, the extendable barrier 458 can be unwound from the reel 457 and attached to the slot 464 when the upright members 452 are deployed. The extendable barrier 458 can be rewound on the reel 457 prior to retracting the upright members 452 into the receptacles 459.

Figure 5:
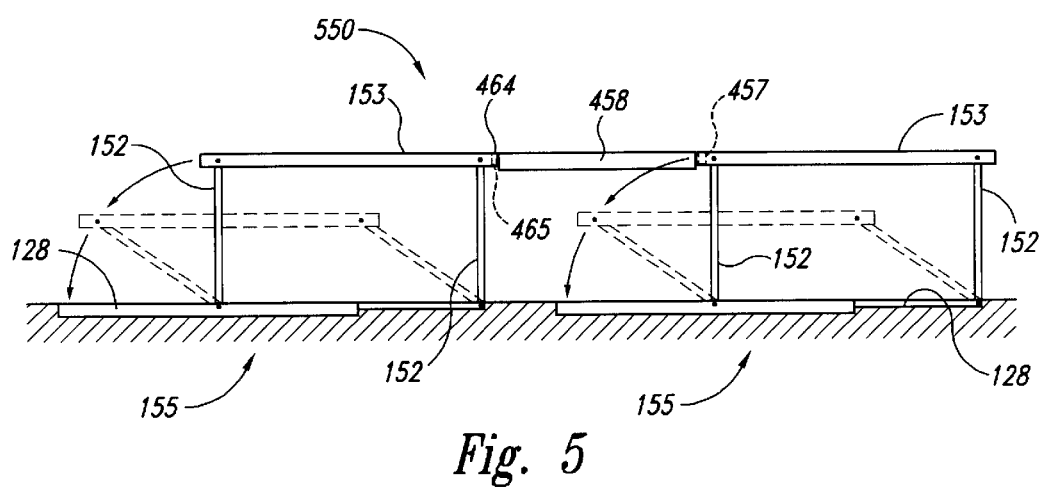
FIG. 5 is a partially schematic, side elevation view of a walkway restriction in accordance with yet another embodiment of the invention.

FIG. 5 is a side elevation view of an embodiment of a restriction 550 that includes features of both the walkway restriction 150 described above with reference to FIG. 3 and the walkway restriction 450 described above with reference to FIG. 4. In one aspect of this embodiment, the walkway restriction 550 can include two spaced apart segments 155, each having a pair of upright members 152 connected to a handrail 153 and movable between a deployed position (shown in solid lines in FIG. 5) and a retracted position in which the segments 155 are received in recesses 128 in the walkway 120. The walkway restriction 550 can further includes an extendable barrier 458 that extends between the two segments 155 in a manner generally similar to that described above with reference to FIG. 4. For example, the extendable barrier 458 can include a fabric band wound on a reel 457 positioned in the handrail 153 or in one of the upright members 152 of one segment 155. The extendable barrier 458 can further include a key 465 that is received in a corresponding slot 464 located in the handrail 153 or in the upright member 152 of the neighboring segment 155. Because the extendable barrier 458 has an adjustable length, it can be used to connect segments 155 that may be positioned on portions of the walkway 120 that move relative to each other. Details of an embodiment of a walkway having such an arrangement are described below with reference to FIG. 10.

Figure 6:
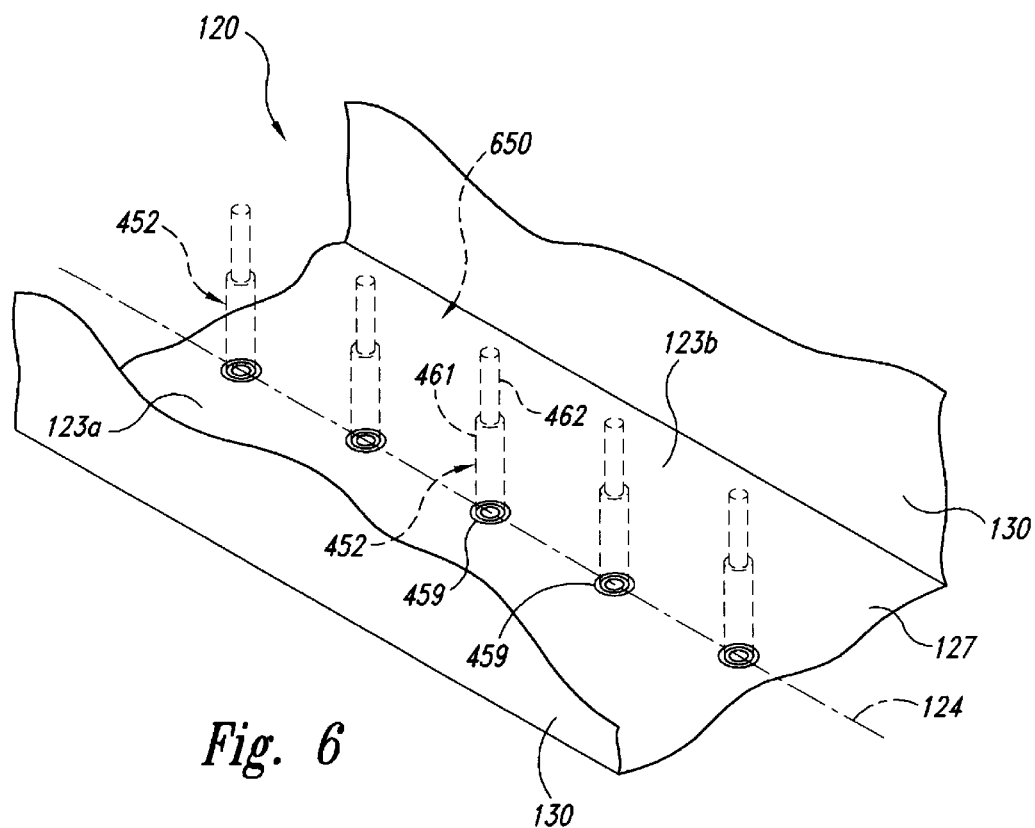
FIG. 6 is a partially schematic, cutaway isometric view of a portion of a walkway having a walkway restriction in accordance with still another embodiment of the invention.

FIG. 6 is partially schematic, cutaway isometric view of a walkway restriction 650 positioned in the walkway 120 in accordance with another embodiment of the invention. In one aspect of this embodiment, the walkway restriction 650 can include a plurality of upright members 452 positioned along the walkway axis 124 and telescopically received in a corresponding plurality of receptacles 459. In one embodiment, each upright member 652 can include an inner shaft 462 slidably received in an outer shaft 461. In another embodiment, each upright member 452 can include more or fewer than two shafts. In any of these embodiments, the upright members 452 can be positioned close enough to each other to at least restrict access between the first walkway aisle 123a and the second walkway aisle 123b without requiring an extendable barrier between adjacent upright members 452.

Figure 7:
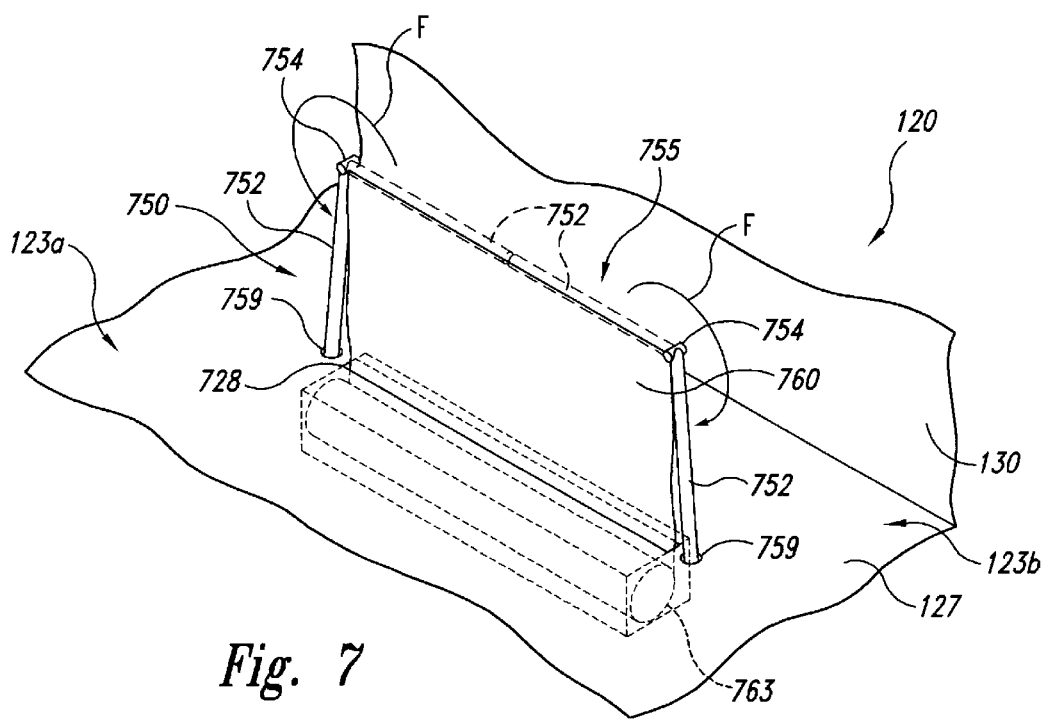
FIG. 7 is a partially schematic, cutaway isometric view of a walkway having a restriction that includes a flexible sheet in accordance with yet another embodiment of the invention.

FIG. 7 is a partially schematic, isometric view of a walkway restriction 750 having one or more upwardly extending flexible sheets 760 positioned in the walkway 120 in accordance with another embodiment of the invention. In one aspect of this embodiment, the walkway restriction 750 can include a plurality of segments 755, one of which is shown in FIG. 7. Each segment 755 can include a flexible sheet 760 that is initially wound on a roller 763 positioned in a recess 728 in the floor portion 127 of the walkway 120. Two upright members 752 are pivotably coupled to the flexible sheet 760 at pivot joints 754 and are initially folded over the end of the flexible sheet 760 (as shown in phantom lines in FIG. 7) when the flexible sheet 760 is stowed in the recess 728. To deploy the walkway restriction 750, the flexible sheet 760 is at least partially unrolled from the roller 763 so as to extend upwardly from the recess 728, and the upright members 752 are rotated outwardly, as indicated by arrows F and positioned in receptacles 759 in the floor portion 127. Accordingly, the upright members 752 can support the flexible sheet 760 in an upright orientation to at least restrict access between the first walkway aisle 123a and the second walkway aisle 123b. The sheet 760 can include any suitable rollable material and can be opaque in one embodiment or transparent or translucent in other embodiments.

Figure 8:
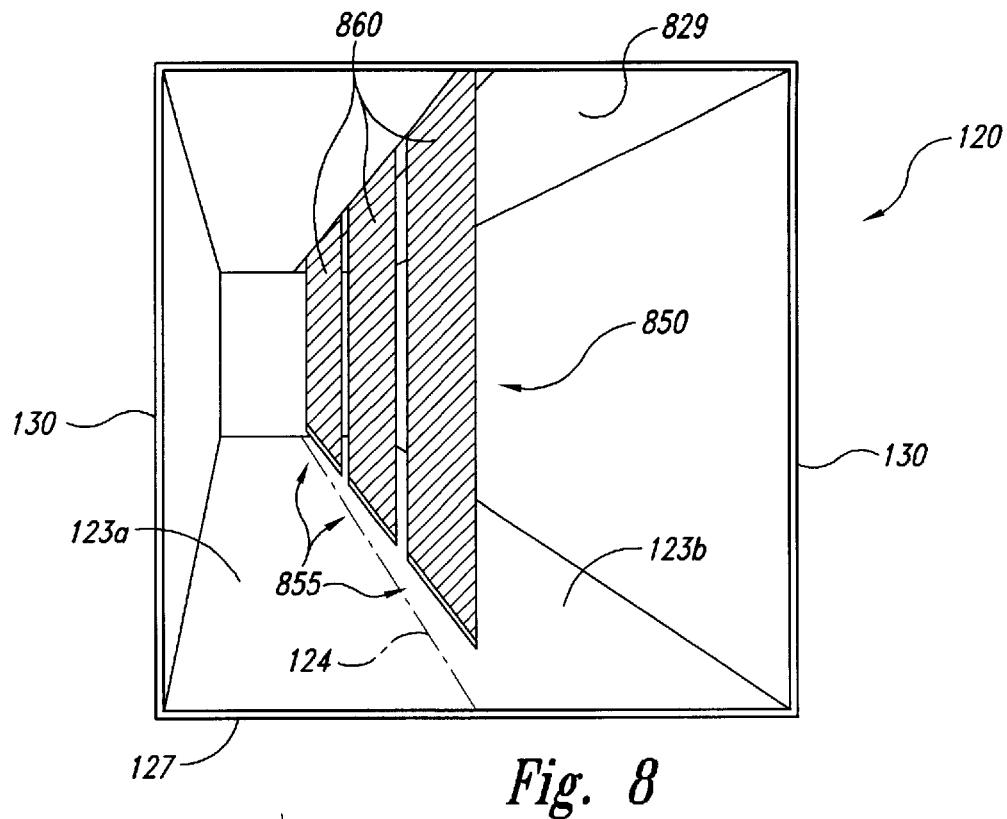
FIG. 8 is a partially schematic, isometric view of a restriction depending from a walkway ceiling in accordance with another embodiment of the invention.

In still further embodiments, any of the walkway restrictions described above with reference to FIGS. 1–7 can be fixedly attached to the walkway 120 and/or can depend from portions of the walkway 120 other than the floor portion 127. For example, as shown in FIG. 8, the walkway 120 can include a ceiling portion 829 positioned above the floor portion 127, and a restriction 850 can depend from the ceiling portion 829. In one aspect of this embodiment, the restriction 850 can include a plurality of segments 855, each of which includes a flexible sheet 860 that can be pulled down from a stowed position (with the flexible sheet 860 at least partially retracted into the ceiling portion 829) to a deployed position (shown in FIG. 8), generally in the manner of a projection screen or window shade. Accordingly, the restriction 850 can restrict and/or prevent access between the first walkway aisle 123a and the second walkway aisle 123b. In other embodiments, the restriction 850 can have other arrangements. For example, the restriction 850 can include upright members and a transverse member (generally similar to but inverted from those described above with reference to FIG. 3) that retract into the ceiling portion 829 by folding or by moving linearly vertically into ceiling recesses.

Figure 9:
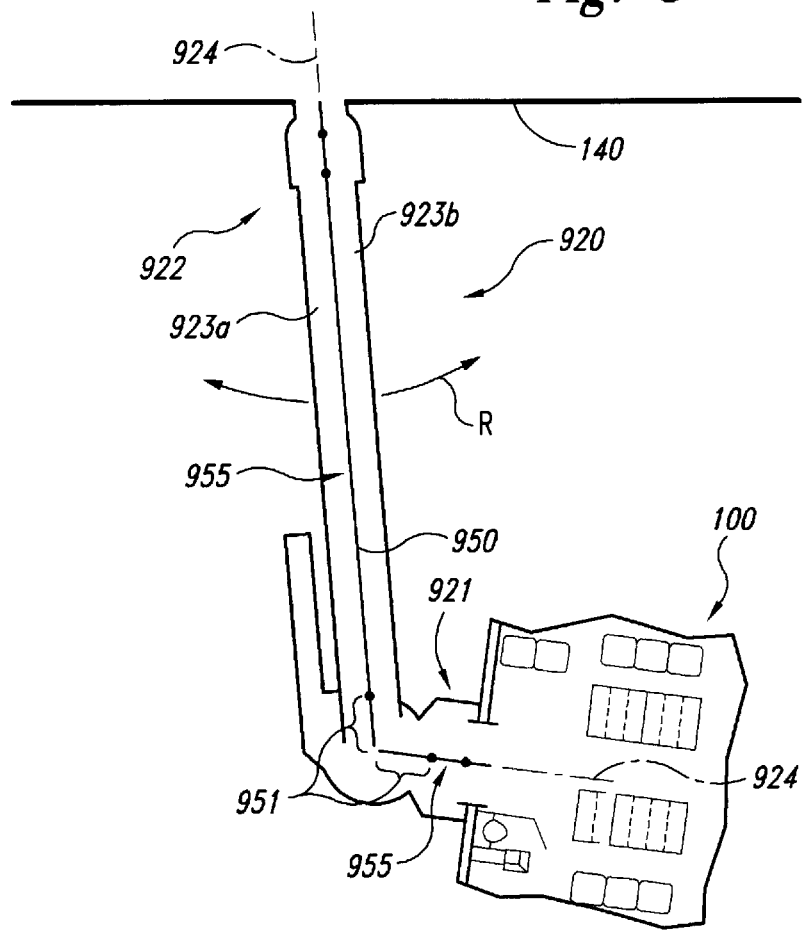
FIG. 9 is a cross-sectional plan view of a pivotable walkway having a restriction in accordance with another embodiment of the invention.
Figure 10:
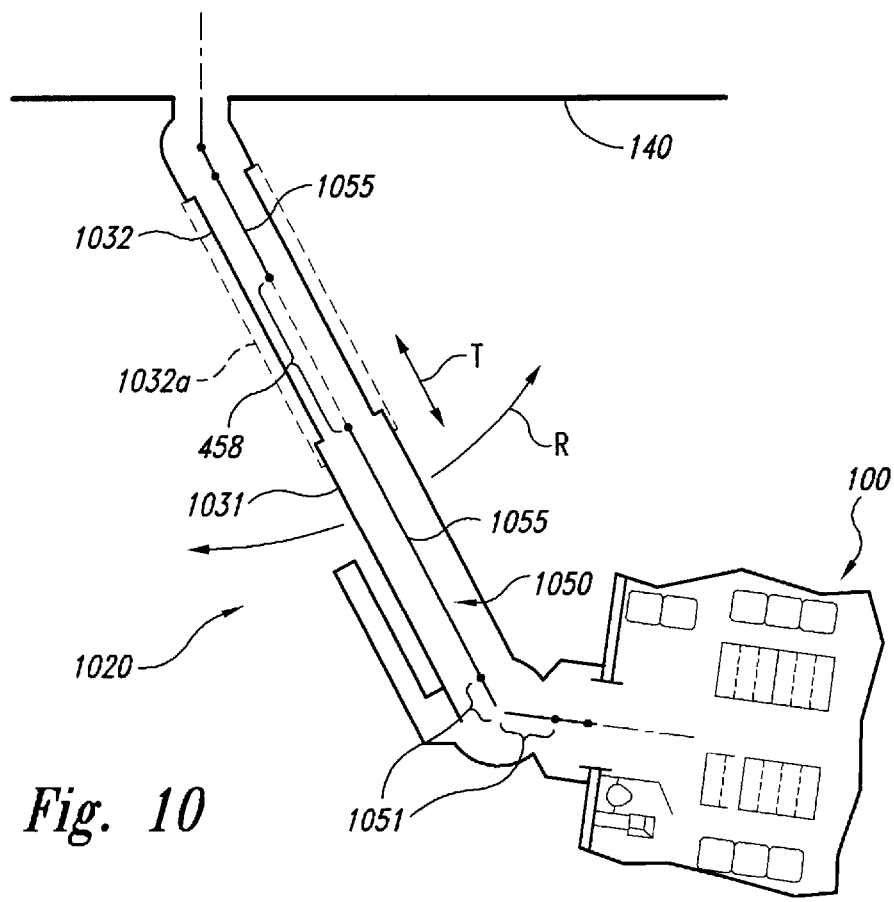
FIG. 10 is a cross-sectional plan view of a pivotable and telescoping walkway having a restriction in accordance with another embodiment of the invention.
Figure 11:
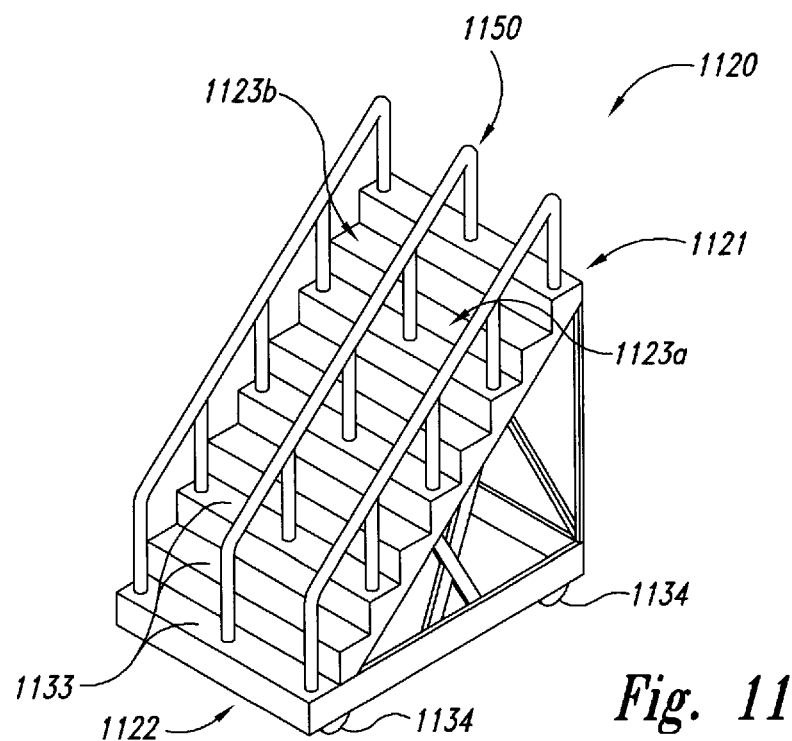
FIG. 11 is a partially schematic isometric view of a walkway having stairs and a restriction in accordance with another embodiment of the invention.

FIGS. 9–11 illustrate walkways having configurations in accordance with other embodiments of the invention, and restrictions generally similar to one or more of those described above with reference to FIGS. 1–8. For example, FIG. 9 illustrates a walkway 920 having a radial bridge construction. Accordingly, the walkway 920 can include a first portion 921 configured to be positioned adjacent to the aircraft 100, and a second portion 922 configured to couple to the terminal structure 140. The first and second portions 921 and 922 can rotate relative to the terminal structure 140 (as indicated by arrow R) to move toward and away from the aircraft 100. The walkway 920 can be elongated along a walkway axis 924 and can include a restriction 950 generally aligned with the walkway axis 924 to divide the walkway 920 into a first walkway aisle 923a and a second walkway aisle 923b. The restriction 950 can include any of the structures described above with reference to FIGS. 1–8. In a further aspect of this embodiment, adjacent segments 955 of the walkway restriction 950 can include extension portions 951 to maintain the separation between the first walkway aisle 923a and the second walkway aisle 923b while accounting for relative motion of portions of the walkway 920.

FIG. 10 is a partially schematic, cross-sectional plan view of a walkway 1020 having an apron-drive bridge arrangement in accordance with another embodiment of the invention. Accordingly, the walkway 1020 can include a first section 1031 that telescopically receives a second section 1032 so as to move axially toward and away from the terminal structure 140 (as indicated by arrow T). The first section 1031 and the second section 1032 can also pivot radially (as indicated by arrow R) relative to the terminal structure 140, providing two degrees of motion with which to align the walkway 1020 relative to the aircraft 100. In another arrangement, an existing second section 1032 that is received in the first section 1031 can be replaced with an alternative second section 1032a (shown in FIG. 10 in dashed lines) to provide additional width for accommodating two side-by-side aisles 1023a and 1023b. In one aspect of this embodiment, the alternative second section 1032a can be retrofitted to the walkway 1020 without requiring that the first section 1031 be replaced.

In another aspect of an embodiment shown in FIG. 10, the walkway 1020 can include a walkway restriction 1050. The walkway restriction 1050 can include segments 1055 that are fixed to the first section 1031 and the second section 1032 and are movable between a deployed position and a stowed position. The walkway 1020 can further include an extendable barrier 458 that extends between the fixed segments 1055 and can account for relative axial motion of the first section 1031 relative to the second section 1032. Accordingly, the walkway restriction 1050 can have an arrangement generally similar to that described above with reference to FIG. 5. The walkway restriction 1050 can also include extensions 1051 that operate in a manner generally similar to that described above with reference to the extensions 151a and 151b shown in FIGS. 2 and 3. In other embodiments, the walkway restriction 1050 can have other arrangements that can be selectively or adjustably deployed to account for movement between the first section 1031 and the second section 1032 of the walkway 1020.

FIG. 11 is an isometric illustration of a walkway 1120 having stairs 1133 in accordance with another embodiment of the invention. The walkway 1120 can include a first portion 1121 configured to be positioned adjacent to an aircraft 100 (FIG. 1) and a second portion 1122 positioned at or near ground level. The walkway 1120 can include a restriction 1150, such as a rigid handrail, attached to the walkway 1120 to divide the walkway into a first walkway aisle 1123a and a second walkway aisle 1123b. In another embodiment, the restriction 1150 can be movable between a deployed position and retracted position. For example, the restriction 1150 can include a plurality of upright members generally similar to the upright members 452 described above with reference to FIG. 6. In other embodiments, the restriction 1150 can have other configurations. In any of these embodiments, the walkway 1120 can be positioned on wheels 1134 so as to be moved to and from an aircraft, and can be open (as shown in FIG. 11) or fitted with a cover or awning.

Figure 12:
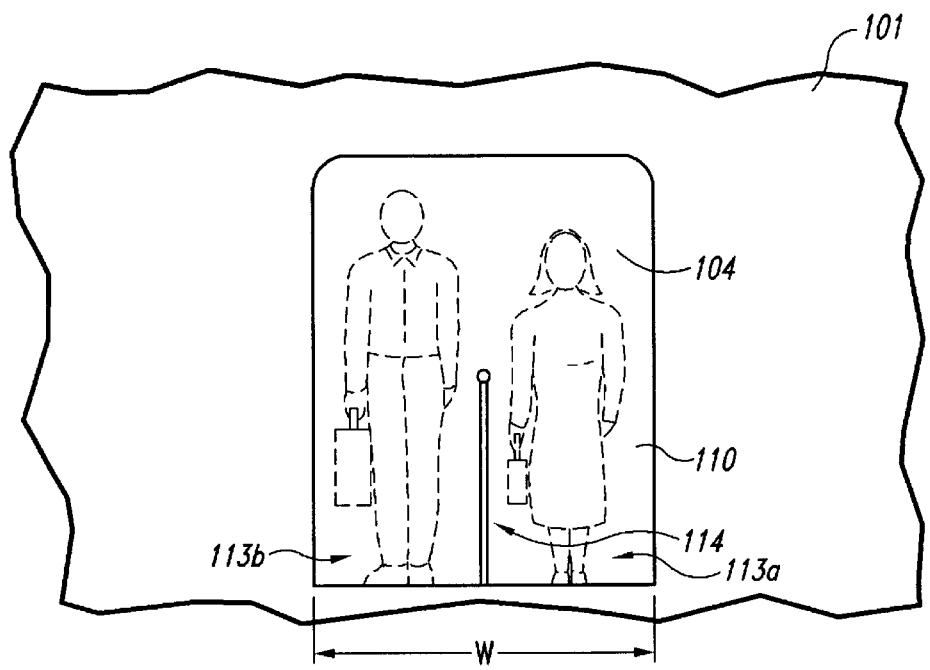
FIG. 12 is a side elevation view of a portion of an aircraft fuselage having a doorway in accordance with an embodiment of the invention.

FIGS. 12–15 illustrate features of the aircraft 100 that can facilitate twin line passenger loading and unloading in accordance with embodiments of the invention. FIG. 12 is a side view of the aircraft fuselage 101, with the doorway 104 open to allow access to the entry region 110 within the aircraft. The entry restriction 114 is positioned at least proximate to the doorway 104 to divide the entry region into a first entry aisle 113a and a second entry aisle 113b. In one aspect of this embodiment, the doorway 104 can have a width W that is greater than the standard aircraft doorway width. For example, most existing aircraft have passenger doorways with a width of 42 inches. In one embodiment, the doorway 104 can have a width of at least 50 inches. In another embodiment, the doorway 104 can have a width W of at least 60 inches. Accordingly, the doorway 104 can more easily accommodate two passengers walking abreast.

Figure 13:
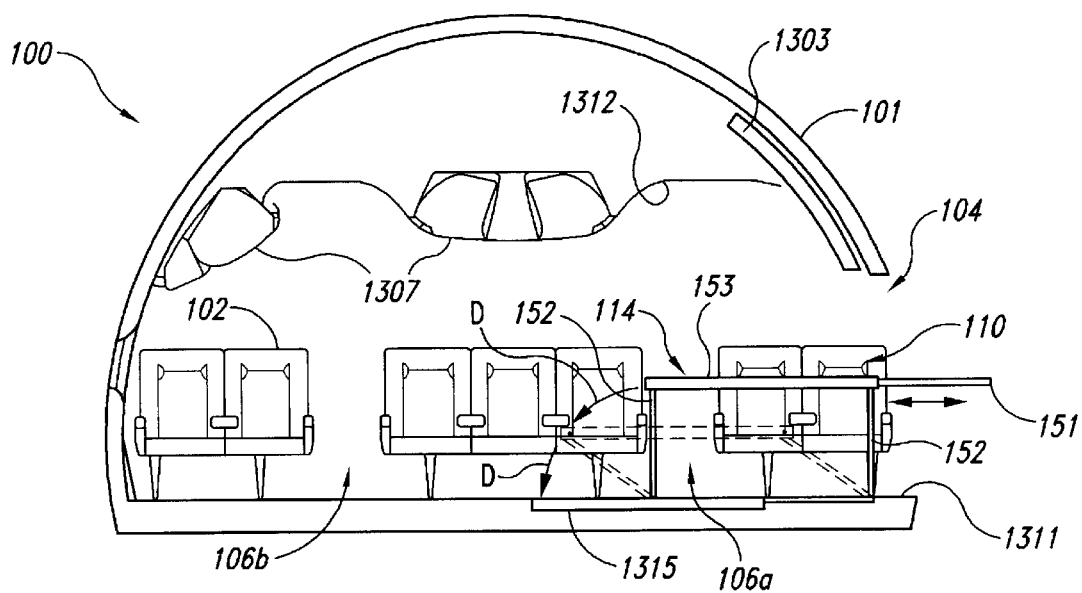
FIG. 13 is a partially schematic, cross-sectional end view of an aircraft fuselage having an entry region with a restriction in accordance with an embodiment of the invention.

FIG. 13 is a partially schematic, cross-sectional view of the fuselage 101, which includes a floor portion 1311 and a ceiling portion 1312 positioned above the floor portion 1311. The floor portion 1311 can support the seats 102 adjacent to the first and second seating aisles 106a, 106b. The ceiling portion 1312 can include overhead bins 1307 in a conventional arrangement. A door 1303 is movably positioned within the doorway 104 and can be retracted into the ceiling portion 1312 when open. In another embodiment (for example, when the door 1303 is less than half as wide as an adjacent walkway), the door 1303 can open outwardly and can fold against the outer surface of the fuselage 101. In either embodiment, the door 1303 can open the doorway 104 and allow passengers to pass into or out of the aircraft 100 adjacent to the entry restriction 114.

The entry restriction 114 can include any of the arrangements described above with reference to FIGS. 1–8. In one particular embodiment, the entry restriction 114 can include two upright members 152 pivotably connected to a handrail 153 and configured to operate in a manner generally similar to the walkway restriction 150 described above with reference to FIG. 3. Accordingly, the entry restriction 114 can move between a deployed position (shown in solid lines in FIG. 13) and a retracted position in which the entry restriction 114 is received in a recess 1315 of the floor portion 1311. The entry restriction 114 can also include an extension portion 151 that can deploy to extend outwardly through the doorway 104 and into an adjacent walkway (not shown in FIG. 13). Accordingly, the entry restriction 114 can maintain the separation between first aisle 106a and the second aisle 106b for at least a short distance outside the aircraft 100, even if the adjacent walkway does not have a walkway restriction.

In other embodiments, the entry restriction 114 can have other configurations. For example, the entry restriction 114 can include a plurality of upright members without handrails generally similar to the arrangement described above with reference to FIG. 6. In other embodiments, the entry restriction 114 can include a planar sheet, such as those described above with reference to FIGS. 7 and 8. In any of these embodiments, the entry restriction 114 can depend from the floor portion 1311, or other parts of the fuselage 101, such as the ceiling portion 1312. The entry restriction 114 can be fixedly mounted in the fuselage 101, or the entry restriction 114 can be moveable between a deployed position (used during passenger loading and unloading) and a stowed position (used during taxi, takeoff, flight and landing), as indicated by arrow D.

Figure 14:
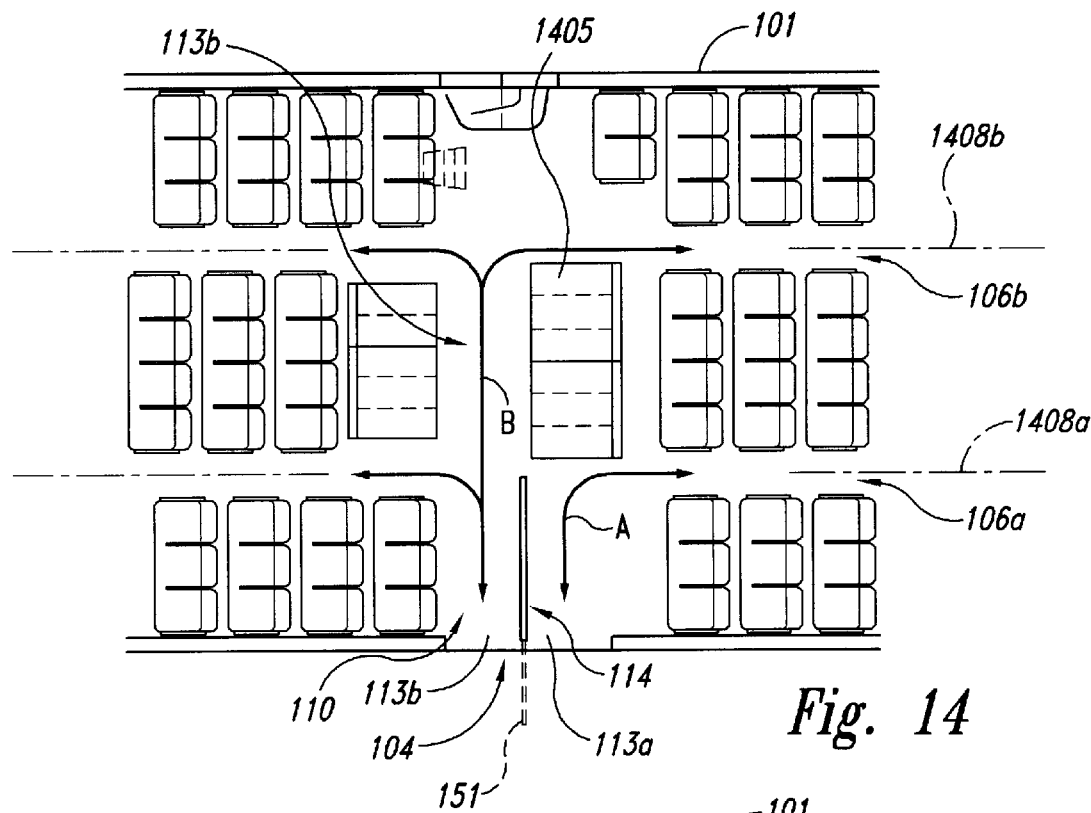
FIG. 14 is a partially schematic, cross-sectional plan view of a portion of an aircraft fuselage having an entry region with a restriction in accordance with an embodiment of the invention.

FIG. 14 is an enlarged, top plan view of a portion of the fuselage 101 described above with reference to FIGS. 1 and 13. As shown in FIG. 14, the first seating aisle 106a can extend along a first seat aisle axis 1408a forward and aft of the doorway 104. The second seating aisle 106b can extend along a second seat aisle axis 1408b forward and aft of the doorway 104. In one embodiment, a galley 1405 can be positioned between the first and second seating aisles 106a,b adjacent to the entry region 110 and can maintain the separation between the first entry aisle 113a and the second entry aisle 113b. Alternatively, the entry restriction 114 alone can be configured to maintain the division between the first entry aisle 113a and the second entry aisle 113b, without the galley 1405. In either embodiment, passengers seated aft of the doorway 104 along the first seating aisle 106a can pass through the first entry aisle 113a (as indicated by arrow A), and passengers seated in the second aisle 106b (and the first aisle 106a forward of the doorway 104) can pass through the second entry aisle 113b (as indicated by arrow B).

Figure 15:
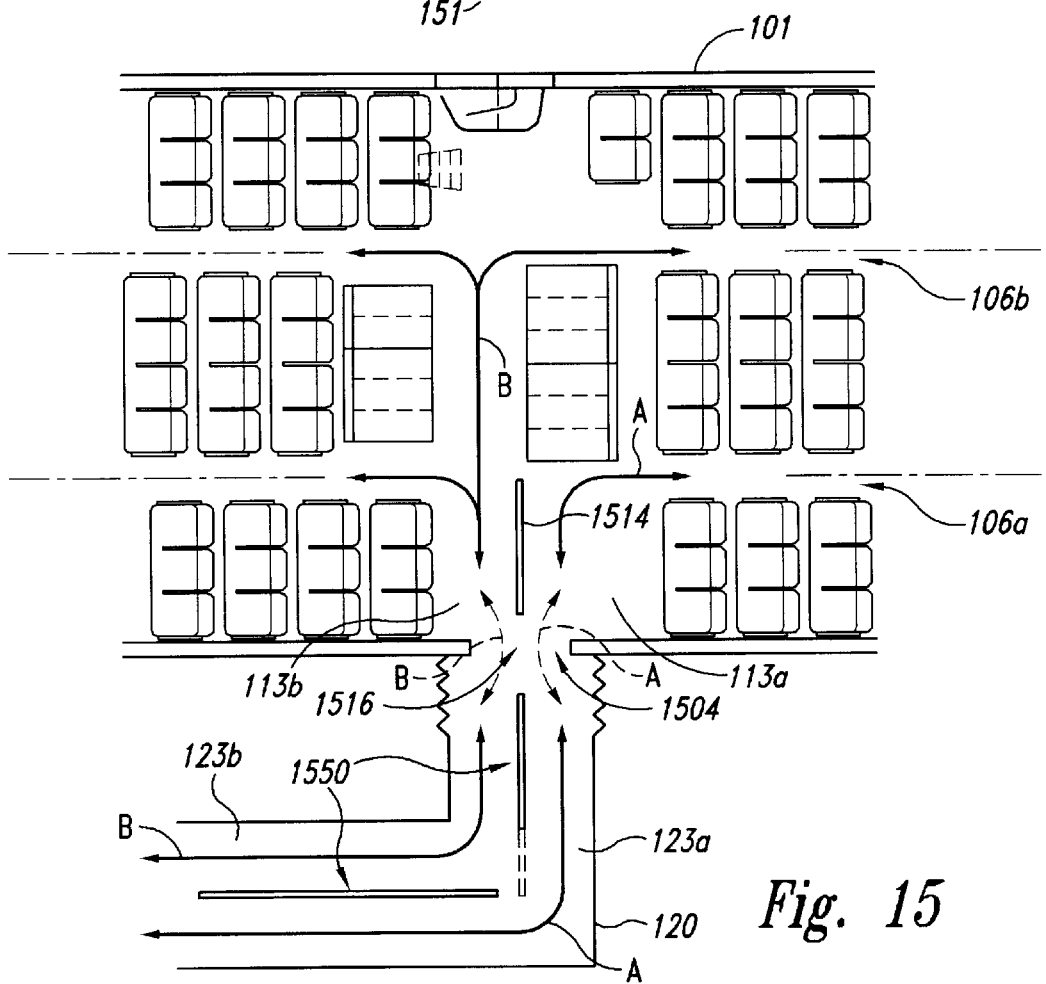
FIG. 15 is a partially schematic, cross-sectional plan view of a portion of an aircraft fuselage positioned adjacent to a walkway and having a doorway and an entry restriction in accordance with still another embodiment of the invention.

FIG. 15 is a top plan view of the fuselage 101 having an entry restriction 1514, and the walkway 120 having a walkway restriction 1550, both in accordance with another embodiment of the invention. In one aspect of this embodiment, the entry restriction 1514 and the walkway restriction 1550 can each be recessed away from a doorway 1504 of the fuselage 101 to leave a restriction gap 1516 between the entry restriction 1514 and the walkway restriction 1550. Accordingly, neither the entry restriction 1514 nor the walkway restriction 1550 extend to or through the doorway 1504. This arrangement can be suitable for aircraft 100 having relatively narrow doorways 1504 (such as a standard 42 inch wide doorway). When the doorway 1504 is not wide enough to accommodate two passengers walking abreast, passengers moving between the first walkway aisle 106a and the first entry aisle 113a can alternate with passengers passing between the second walkway aisle 123b and the second entry aisle 113b, as indicated by the phantom portions of arrows A and B. Although this arrangement is not as efficient as one in which the doorway can accommodate two passengers walking abreast, the flow of passengers can be improved over existing arrangements in which the fuselage 101 lacks an entry restriction 1514 and the walkway 120 lacks a walkway restriction 1550.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An apparatus for loading and/or unloading people from an aircraft, comprising:
   a walkway elongated along a longitudinal axis and having a first portion toward a first end of the longitudinal axis and a second portion toward a second end of the longitudinal axis, the first portion being configured to be positioned adjacent to an aircraft doorway, the walkway having a width generally transverse to the longitudinal axis, the width being sized to accommodate at least two people walking abreast; and
   a restriction coupled to the walkway and extending along the longitudinal axis, the restriction being movable between a deployed position and a stowed position, wherein the restriction in the deployed position divides the walkway into a first aisle and a second aisle with each aisle being elongated along the longitudinal axis and with the restriction at least restricting movement by people from the first aisle to the second aisle, wherein the restriction in the stowed position remains coupled to the walkway.

2. The apparatus of claim 1 wherein the walkway includes a floor portion and wherein the restriction is movable between a deployed position and a stowed position, the restriction being at least partially housed in the floor portion of the walkway when in the stowed position.

3. The apparatus of claim 1 wherein the walkway includes a floor portion having a recess and wherein the restriction includes a first upright member, a second upright member, and a handrail pivotably coupled between the first and second upright members, wherein each upright member is pivotably coupled to the floor portion and is pivotable between a deployed position with the upright member generally upright and a stowed position with the upright member at least partially recessed in the floor portion.

4. The apparatus of claim 1 wherein the walkway includes a floor portion, two spaced apart wall portions extending upwardly from the floor portion, and a ceiling portion extending from the wall portions over at least part of the floor portion.

5. The apparatus of claim 1 wherein the walkway includes a generally planar ramp.

6. The apparatus of claim 1 wherein the walkway includes a plurality of stairs extending along the longitudinal axis.

7. The apparatus of claim 1 wherein the restriction includes a generally planar flexible sheet wound on a roller and movable relative to the roller between a deployed position with the sheet at least partially unwound from the roller, and a stowed position with the sheet at least partially wound on the roller.

8. The apparatus of claim 1 wherein the second portion of the walkway is configured to be attached to an airport terminal structure.

9. The apparatus of claim 1 wherein the walkway includes a staircase and wherein the second portion of the walkway is configured to be positioned at or near ground level.

10. The apparatus of claim 1 wherein the restriction includes a first upright member, a second upright member spaced apart from the first upright member, and a transverse member extending between the first and second upright members.

11. The apparatus of claim 1 wherein the restriction includes a first upright member, a second upright member, and a handrail extending between the first and second upright members, further wherein the restriction includes an extension extending away from both the first and second upright members along the longitudinal axis.

12. The apparatus of claim 1 wherein the restriction is segmented and includes a first segment and a second segment, with each of the first and second segments being independently movable relative to the walkway between a deployed position in which the segments at least restrict movement by people between the first and second aisles, and a stowed position in which the segments allow movement by people between the first and second aisles.

13. The apparatus of claim 1 wherein the restriction includes a reel and a flexible, coilable, elongated barrier extendibly coiled on the reel.

14. The apparatus of claim 1 wherein the restriction includes a plurality of spaced apart, upright members positioned along the longitudinal axis with the upright members spaced sufficiently close together to at least restrict movement by people between the first and second aisles.

15. The apparatus of claim 1 wherein the walkway includes a floor portion and wherein the restriction includes a plurality of spaced apart, upright members, with each upright member being movable relative to the floor portion between a deployed position and a stowed position, each upright member being at least partially stowed in the floor when in the stowed position.

16. The apparatus of claim 1 wherein the walkway includes a first section and a second section, with the first section telescopically received in the second section, and wherein the restriction includes a first restriction segment depending from the first section of the walkway, and a second restriction segment depending from the second section of the walkway.

17. The apparatus of claim 1 wherein the width of the walkway is about 50 inches or more.

18. The apparatus of claim 1 wherein the walkway includes a floor portion and a ceiling portion positioned over the floor portion, and wherein the restriction depends from the ceiling portion.

19. The apparatus of claim 1 wherein the first portion of the walkway includes an opening positioned to allow people to move between the walkway and the aircraft door, and wherein at least a portion of the restriction extends outwardly through the opening.

20. The apparatus of claim 1 wherein the first portion of the walkway includes an opening positioned to allow people to move between the walkway and the aircraft door, and wherein the restriction is movable between a stowed position and a deployed position, further wherein the restriction extends outwardly through the opening when in the deployed position.

21. The apparatus of claim 1 wherein the restriction includes a generally planar sheet.

22. An apparatus for loading and/or unloading people from an aircraft, comprising:

a walkway having a first portion and a second portion, the first portion being configured to be positioned adjacent to an aircraft doorway, the second portion being configured to couple to an aircraft terminal building, wherein the first and second portions are movable relative to each other, the walkway being elongated along a longitudinal axis extending from the first portion to the second portion, the walkway having a width generally transverse to the longitudinal axis, the width being sized to accommodate at least two people walking abreast, the walkway having a first aisle extending along a first side of the longitudinal axis, the walkway having a second aisle extending along a second side of the longitudinal axis; and a restriction movably coupled to the walkway to move between a deployed position and a stowed position, with the restriction extending along the longitudinal axis to at least restrict movement by people from the first aisle to the second aisle when the restriction is in the deployed position, and with the restriction allowing movement by people from the first aisle to the second aisle when the restriction is in the stowed position, the restriction being selectively movable between the deployed and stowed positions.

23. The apparatus of claim 22 wherein the restriction includes a generally planar, flexible sheet wound on a roller and movable relative to the roller between the deployed position with the sheet at least partially unwound from the roller, and the stowed position with the sheet at least partially wound on the roller.

24. The apparatus of claim 22 wherein the walkway includes a floor portion and wherein the restriction is at least partially housed in the floor portion of the walkway when in the stowed position.

25. The apparatus of claim 22 wherein the walkway includes a floor portion having a recess and wherein the restriction includes a first upright member, a second upright member, and a handrail pivotably coupled between the first and second upright members, wherein each upright member is pivotably coupled to the floor portion and is pivotable between the deployed position with the upright member generally upright and the stowed position with the upright member at least partially recessed in the floor portion.

26. The apparatus of claim 22 wherein the restriction includes a first upright member, a second upright member and a transverse member extending between the first and second upright members.

27. The apparatus of claim 22 wherein the restriction includes a first upright member, a second upright member, and a handrail extending between the first and second upright members, further wherein the restriction includes an extension projecting away from both the first and second upright members along the longitudinal axis.

28. The apparatus of claim 22 wherein the restriction is segmented and includes a first segment and a second segment, with each of the first and second segments being independently movable relative to the walkway between a deployed position in which the segment at least restricts movement by the people between the first and second aisles and a stowed position in which the segment allows movement by the people between the first and second aisles.

29. The apparatus of claim 22 wherein the restriction includes a reel and a flexible, coilable, elongated barrier extendibly coiled on the reel.

30. The apparatus of claim 22 wherein the restriction includes a plurality of spaced apart, upright members positioned along the longitudinal axis.

31. The apparatus of claim 22 wherein the restriction includes a plurality of spaced apart, upright members positioned along the longitudinal axis, with each upright member having at least a first shaft and a second shaft telescopically received in the first shaft, and wherein each upright member is received in a recess in a floor portion of the walkway when the upright member is in the stowed position.

32. The apparatus of claim 22 wherein the walkway includes a floor portion and wherein the restriction includes a plurality of spaced apart, upright members, with each upright member at least partially stowed in the floor portion when the restriction is in the retracted position.

33. The apparatus of claim 22 wherein the width of the walkway is about 50 inches or more.

34. The apparatus of claim 22 wherein the walkway includes a floor portion and a ceiling portion positioned over the floor portion, and wherein the restriction depends from the ceiling portion.

35. The apparatus of claim 22 wherein the first portion of the walkway includes an opening positioned to allow people to move between the walkway and the aircraft door, and wherein at least a portion of the restriction extends outwardly through the opening.

36. The apparatus of claim 22 wherein the restriction includes a generally planar sheet.

37. An apparatus for loading and/or unloading people from an aircraft, comprising:
  a passenger walkway having a first portion and a second portion, the first portion being configured to be positioned adjacent to an aircraft doorway, the second portion being configured to couple to an aircraft terminal building, the first and second portions each having a floor portion, two wall portions extending upwardly from the floor portion, and a ceiling portion extending from the wall portions over the floor portion, the walkway being elongated along a longitudinal axis extending from the first portion to the second portion, the longitudinal axis dividing the walkway into a first aisle and a second aisle, with each aisle sized to accommodate at least one person walking along the longitudinal axis; and
  a restriction assembly movably coupled to the floor portion of the walkway, the restriction assembly including a first restriction segment movably coupled to the first portion of the walkway and a second restriction segment movably coupled to the second portion of the walkway, each restriction segment being movable relative to the walkway between a deployed position and a stowed position, with each restriction segment at least restricting movement by people from the first aisle to the second aisle when in the deployed position, and with each restriction segment at least partially retracted into the floor portion of the walkway to allow movement by people from the first aisle to the second aisle when in the stowed position, the restriction segments being selectively movable between the deployed and stowed positions.

38. The apparatus of claim 37 wherein at least one of the restriction segments includes a reel and a flexible, coilable, elongated barrier extendibly coiled on the reel.

39. The apparatus of claim 37 wherein the restriction segments each include a first upright member, a second upright member, and a handrail pivotably coupled between the first and second upright members, wherein each upright member is pivotably coupled to the floor portion and is pivotable between the deployed position with the upright member generally upright and the stowed position with the upright member at least partially recessed in the floor portion.

40. The apparatus of claim 37 wherein the first and second restriction segments are spaced apart from each other when in the deployed position, and wherein the walkway further comprises an extendable barrier having an adjustable length and being coupled between the first and second restriction segments.

41. The apparatus of claim 37 wherein the first and second segments are each independently movable relative to the walkway between the deployed position and the stowed position.

42. An apparatus for loading and/or unloading people from an aircraft, comprising:
  a walkway elongated along a longitudinal axis and having a first portion toward one end of the longitudinal axis and a second portion toward the other end of the longitudinal axis, the first portion being configured to be positioned adjacent to an aircraft doorway, the walkway having a width generally transverse to the longitudinal axis, the width being sized to accommodate at least two people walking abreast, the walkway having a first aisle on a first side of the longitudinal axis and a second aisle on a second side of the longitudinal axis; and
  restriction means for at least restricting movement by people from the first aisle to the second aisle, the restriction means being coupled to the walkway and extending along the longitudinal axis, wherein the restriction means are movable between a deployed position and a stowed position.

43. The apparatus of claim 42 wherein the restriction means include a first upright member, a second upright member spaced apart from the first upright member, and a transverse member extending between the first and second upright members.

44. The apparatus of claim 42 wherein the restriction means include a first upright member, a second upright member and a handrail extending between the first and second members, further wherein the restriction means include an extension projecting away from both the first and second upright members along the longitudinal axis.

45. The apparatus of claim 42 wherein the restriction means include a reel and a flexible, coilable, elongated barrier extendibly coiled on the reel.

46. The apparatus of claim 42 wherein the restriction means include a plurality of spaced apart, upright members positioned along the longitudinal axis with the upright members spaced sufficiently close together to at least restrict movement by people between the first and second aisles.

47. The apparatus of claim 42 wherein the restriction means include a generally planar sheet.

48. A method for loading and/or unloading people from an aircraft, comprising:
  providing a walkway elongated along a longitudinal axis and having a restriction extending along the longitudinal axis with a first aisle positioned on a first side of the restriction and a second aisle positioned on a second side of the restriction, the restriction being movable between a deployed position and a stowed position, wherein the restriction in the stowed position remains coupled to the walkway;
  aligning the walkway with an aircraft door;
  directing first and second groups of people to pass through the walkway and the aircraft door; and
  directing the first group of people to pass through the first aisle and simultaneously directing the second group of people to pass through the second aisle while at least restricting access between the first and second aisles with the restriction.

49. The method of claim 48, further comprising deploying the restriction from a ceiling portion of the walkway.

50. The method of claim 48 further comprising disposing at least a portion of the restriction through the aircraft doorway.

51. The method of claim 48, further comprising deploying the restriction by at least partially unrolling a generally planar sheet member of the restriction between the first and second aisles.

52. The method of claim 48 wherein the walkway includes a floor portion and wherein the method further comprises moving the restriction between a deployed position and a stowed position, the restriction being at least partially housed in the floor portion of the walkway when in the stowed position.

53. The method of claim 48 wherein the walkway includes a floor portion having a recess and wherein the restriction includes a first upright member, a second upright member, and a handrail pivotably coupled between the first and second upright members, wherein each upright member is pivotably coupled to the floor portion and is pivotable between a deployed position with the upright member generally upright and a stowed position with the upright member at least partially recessed in the floor portion, and wherein the method further comprises moving the restriction between the stowed position and the deployed position by pivoting the restriction relative to the floor portion of the walkway.

54. The method of claim 48 wherein the second portion of the walkway is attached to an airport terminal structure, and wherein the method further comprises moving the first portion of the walkway relative to the aircraft.

55. The method of claim 48 wherein the walkway includes a staircase and wherein the method further comprises rolling the staircase toward and away from the aircraft.

56. The method of claim 48 wherein the restriction includes at least one upright member and an extension projecting transverse to the at least one upright member, and wherein the method further comprises disposing the extension member through the doorway of the aircraft.

57. The method of claim 48 wherein the restriction includes a first segment and a second segment with each segment being movable between a deployed position and a stowed position, and wherein the method further comprises moving the first segment between its stowed and deployed positions independently of moving the second segment between its stowed and deployed positions.

58. The method of claim 48 wherein the restriction includes a reel and a flexible, coilable, elongated barrier extendibly coiled on the reel and wherein the method further comprises uncoiling the elongated barrier from the reel and coiling the elongated barrier on the reel.

59. The method of claim 48 wherein the walkway includes a floor portion and wherein the restriction includes a plurality of spaced apart, upright members, and wherein the method further comprises moving each upright member relative to the floor portion between a stowed position with each upright member at least partially retracted in the floor portion and a deployed position with each upright member extending upwardly from the floor portion.

60. The method of claim 48, further comprising telescoping one section of the walkway relative to another section of the walkway.

61. A method for loading and/or unloading people from an aircraft, comprising:

providing a walkway elongated along a longitudinal axis;

deploying a restriction in the walkway with the restriction extending along the longitudinal axis to divide the walkway into a first aisle positioned on a first side of the restriction and a second aisle positioned on a second side of the restriction, the restriction being movable between a deployed position and a stowed position;

aligning the walkway with an aircraft door;

directing the first group of people to pass through the aircraft door and through the first aisle, and simultaneously directing the second group of people to pass through the doorway of the aircraft and through the second aisle while at least restricting access between the first and second aisles with the restriction; and stowing the restriction to allow access between the first and second aisles, wherein the restriction in the stowed position remains coupled to the walkway.

62. The method of claim 61 wherein the walkway includes a floor portion and wherein deploying the restriction includes moving the restriction upwardly out of a recess in the floor portion.

63. The method of claim 61 wherein the walkway includes a floor portion having a recess and wherein the restriction includes a first upright member, a second upright member, and a handrail pivotably coupled between the first and second upright members, wherein each upright member is pivotably coupled to the floor portion and pivotable between a deployed position with the upright member generally upright and a stowed position with the upright member at least partially recessed in the floor portion, and wherein deploying the restriction includes pivoting the restriction upwardly out of the recess in the floor portion of the walkway.

64. The method of claim 61 wherein the restriction includes at least one upright member and an extension projecting transversely to the at least one upright member, and wherein the method further comprises disposing the extension member through the doorway of the aircraft.

65. The method of claim 61 wherein the restriction includes a reel and a flexible, coilable, elongated barrier extendibly coiled on the reel and wherein deploying the restriction includes uncoiling the elongated barrier from the reel.

66. The method of claim 61 wherein the walkway includes a floor portion and wherein the restriction includes a plurality of spaced apart, upright members housed in the floor portion, and wherein deploying the restriction includes moving each upright member upwardly relative to the floor portion.

67. The method of claim 61, wherein deploying the restriction includes deploying the restriction from a ceiling portion of the walkway.

68. The method of claim 61 further comprising disposing at least a portion of the restriction through the aircraft doorway.

69. The method of claim 61 wherein deploying the restriction includes at least partially unrolling a generally planar sheet member of the restriction between the first and second aisles.

70. A method for making an apparatus for loading and/or unloading people from an aircraft, comprising:

forming a walkway elongated along a longitudinal axis and having a first portion toward one end of the longitudinal axis and a second portion toward the other end of the longitudinal axis, the first portion being configured to be positioned adjacent to an aircraft doorway, the walkway having a width generally transverse to the longitudinal axis, the width being sized to accommodate at least two people walking abreast, the walkway having a first aisle positioned on a first side of the longitudinal axis and a second aisle positioned on a second side of the longitudinal axis;

aligning a restriction with the longitudinal axis of the walkway, the restriction being movable between a deployed position and a stowed position; and coupling the restriction to the walkway with the restriction being positioned to at least restrict movement by people from the first aisle to the second aisle, wherein the restriction in the stowed position remains coupled to the walkway.

71. The method of claim 70 wherein the walkway includes a floor portion and wherein coupling the restriction includes coupling the restriction to be movable between a deployed position and a stowed position, the restriction being at least partially housed in the floor portion of the walkway when in the stowed position.

72. The method of claim 70 wherein the walkway includes a floor portion having a recess and wherein coupling the restriction includes pivotably coupling a first upright member and a second upright member to the floor portion and pivotably coupling a handrail between the first and second upright members, wherein each upright member is pivotable between a deployed position with the upright member generally upright and a stowed position with the upright member at least partially recessed in the floor portion.

73. The method of claim 70 wherein forming the walkway includes forming a floor portion, two spaced apart wall portions extending upwardly from the floor portion, and a ceiling portion extending from the wall portions over at least part of the floor portion.

74. The method of claim 70 wherein forming the walkway includes forming a walkway having plurality of stairs extending along the longitudinal axis.

75. The method of claim 70 wherein coupling the restriction includes coupling first and second upright members to the walkway and coupling a transverse member between the first and second upright members.

76. The method of claim 70 wherein the restriction includes a first upright member, a second upright member and a handrail extending between the first and second upright members, and wherein the method further comprises coupling an extension to the restriction, the extension projecting away from both the first and second upright members along the longitudinal axis.

77. The method of claim 70 wherein coupling the restriction includes coupling a segmented restriction having a first segment and a second segment, with each of the first and second segments being independently movable relative to the walkway between a deployed position in which the segment at least restricts movement by the people between the first and second aisles, and a stowed position in which the segment allows movement by the people between the first and second aisles.

78. The method of claim 70 wherein coupling the restriction includes coupling a reel having a flexible, coilable, elongated barrier extendibly coiled on the reel.

79. The method of claim 70 wherein coupling the restriction includes coupling a plurality of spaced apart, upright members along the longitudinal axis.

80. The method of claim 70 wherein the walkway includes a floor portion and wherein coupling the restriction includes coupling a plurality of spaced apart, upright members to the floor portion, with each upright member being movable relative to the floor portion between a deployed position and a stowed position, each upright member being at least partially stowed in the floor portion when in the stowed position.

81. The method of claim 70 wherein forming the walkway includes forming the walkway to have a width of about 50 inches or more.

82. The method of claim 70 wherein the walkway includes a floor portion and a ceiling portion positioned over the floor portion, and wherein coupling the restriction includes coupling the restriction to the ceiling portion of the walkway.

83. The method of claim 70 wherein coupling the restriction includes coupling a generally planar sheet member to the walkway, the sheet member being aligned with the longitudinal axis.

84. A method for retrofitting an apparatus for loading and/or unloading people from an aircraft, the apparatus having a walkway elongated along a longitudinal axis, the method comprising:

aligning a restriction with the longitudinal axis of the walkway; and coupling the restriction to the walkway, the restriction being movable between a deployed position and a stowed position, with the deployed restriction being positioned to at least restrict movement by people from a first aisle positioned on a first side of the longitudinal axis to a second aisle positioned on a second side of the longitudinal axis, and wherein the restriction in the stowed position remains coupled to the walkway.

85. The method of claim 84 wherein at least a portion of the walkway has a first width and wherein the method further comprises increasing the width of the portion of the walkway from the first width to the second width.

86. The method of claim 84 wherein a first portion of the walkway has a first width and wherein the method further comprises replacing the first portion with a second portion having a second width greater than the first width.

87. The method of claim 84 wherein the walkway has a first strength and wherein the method further comprises increasing the strength of the walkway from the first strength to a second strength greater than the first strength.

88. The method of claim 84 wherein the walkway includes a floor portion and wherein coupling the restriction includes pivotably coupling a first upright member and a second upright member to the floor portion and pivotably coupling a handrail between the first and second upright members, wherein each upright member is pivotable between a deployed position with the upright member generally upright and a stowed position with the upright member at least partially recessed in the floor portion.

89. The method of claim 84 wherein coupling the restriction includes coupling first and second upright members to the walkway and coupling a transverse member between the first and second upright members.

90. The method of claim 84 wherein coupling the restriction includes coupling a first upright member, a second upright member and a handrail extending between the first and second upright members, and wherein the method further comprises coupling an extension to the restriction with the extension extending away from both the first and second upright members along the longitudinal axis.

91. The method of claim 84 wherein coupling the restriction includes coupling a segmented restriction having a first segment and a second segment, with each of the first and second segments being independently movable relative to the walkway between a deployed position in which the segment at least restricts movement by the people between the first and second aisles, and a stowed position in which the segment allows movement by the people between the first and second aisles.

92. The method of claim 84 wherein coupling the restriction includes coupling a reel having a flexible, coilable, elongated barrier extendibly coiled on the reel.

93. The method of claim 84 wherein coupling the restriction includes coupling a plurality of spaced apart, upright members along the longitudinal axis.

94. The method of claim 84 wherein the walkway includes a floor portion and wherein coupling the restriction includes coupling a plurality of spaced apart, upright members to the floor portion, with each upright member being movable relative to the floor portion between a deployed position and a stowed position, each upright member being at least partially stowed in the floor portion when in the stowed position.

95. The method of claim 84 wherein the walkway includes a floor portion and a ceiling portion positioned over the floor portion, and wherein coupling the restriction includes coupling the restriction to the ceiling portion of the walkway.

96. The method of claim 84 wherein coupling the restriction includes coupling a generally planar sheet member to the walkway, the sheet member being aligned with the longitudinal axis.

* * * * *